Inventors: Ernst Felix
Ernst Meili by: Robert W. Siddle

ATTORNEY

United States Patent Office 3,408,560
Patented Oct. 29, 1968

3,408,560
APPARATUS FOR INCREASING THE VIRTUAL SENSING FIELD LENGTH OF SENSING ELEMENTS IN ELECTRONIC CONTROL INSTRUMENTS, MAINLY IN THE TEXTILE INDUSTRY
Ernst Felix and Ernst Meili, Uster, Switzerland, assignors to Zellweger, Ltd., Uster, Switzerland
Filed Oct. 1, 1964, Ser. No. 400,702
Claims priority, application Switzerland, Oct. 1, 1963, 12,137/63
6 Claims. (Cl. 323—100)

ABSTRACT OF THE DISCLOSURE

Means, including both method and apparatus permitting a single adjustment to be made to increase the virtual sensing field length of the sensing elements of a plurality of electronic control instruments, said means employing a common power supply, or control voltage source, for all of the control instruments, said power supply having an adjustable voltage with an RC circuit having selectively variable parameters arranged in the circuit between the power supply and the control instruments to influence the frequency curve of the output signal of the control instrument.

---

Figure 1:
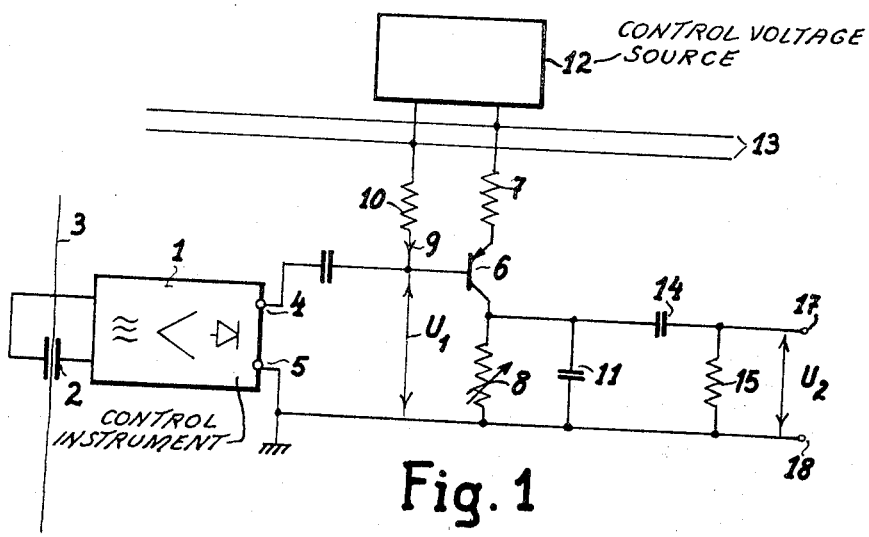

This invention relates to the art of quality control equipment, more particularly to means for increasing the virtual sensing field length of sensing elements in electronic control instruments, such as used in the textile industry.

A large number of electronic control instruments are known in textile technology, which utilize a sensing element through which the textile or other material to be controlled runs, with said sensing element providing an electrical signal representative of a quality of the material to be controlled, such as the cross-section, or change in cross-section of the textile material. This electrical signal is then interpreted or otherwise utilized to effect desired control. The electrical signal depends to a large extent on the form and structure of the sensing elements, especially on their sensing field length. Since the variations in weight per unit length in textile material such as slivers, rovings and yarns in the spinning process may be of practically any length down to a lower limit of a few millimetres, there is a lack of ability to detect some of the variations in cross-section, depending on the sensing field length available in the control instrument, due to the fact that a mean value is taken over this sensing field length in the sensing element. However, the choice of sensing field length is limited. For constructional reasons, the length can be only within very narrow limits and the choice of short lengths is usually limited by the minimum sensitivity required. On the other hand, there is sometimes required a very highly differentiated interpretation of the electrical signals according to various criteria of length, so that a measuring element with an adjustable sensing field length becomes necessary. It should be possible to choose the measuring field length according to whether, in a particular case, certain variations are to be emphasized or ignored. Thus, for constructional reasons, measuring elements used in electronic yarn cleaners have a length of about 1 cm., although a length of 2 to 5 cm. or more would be desirable for solving certain cleaning problems. For example, a yarn contains a so-called "fly" which may produce a localized increase in cross-section of 500% or more above the mean cross-section. But this increase extends over a length of only a few millimetres. For certain purposes, however, "fly" should not be removed by the cleaner. On the other hand, yarns may contain so-called "torpedoes" which are elongated thickenings of the yarn which extend over 5 to 50 cm. but produce only about a three-fold increase in the cross-section of the yarn, and it is absolutely essential to remove them by the cleaning process. In a short sensing element, a piece of fly will produce a strong impulse but a torpedo only a much weaker impulse, whereas a longer sensing element will respond to the fly with a much smaller signal amplitude than to a torpedo because the mean value is taken over the whole measuring field length and the torpedo extends over the entire length of the field.

Another reason why an adjustable measuring field length would be desirable is that in the processing of different raw materials, the cross-sectional form of the faults differ. In this case, adjustment of the measuring field length would be desirable in order to avoid having to provide different quality control equipment for each material.

Solutions of these problems whereby a virtual increase in the length of such sensing elements is achieved by electrical means are already known. These known solutions feed the electrical signal produced in the sensing element through an RC circuit having component values so that the circuit acts as a low pass filter in which the voltage variations proportional to the sensed material variations are averaged according to the time constants of this RC circuit. In the measurement of yarns, this arrangement substantially follows the equation: $L = K.V.R.C.$ where $L$ = virtual measuring field length in cm.
$K$ = proportionality factor, approximately 2–3 for spun yarns
$V$ = velocity of the passage of the yarn in cm./sec.
$R$ = resistance in megohms
$C$ = capacitance in microfarads It follows from this that the virtual sensing field length depends not only on the time constants R and C but also on the velocity V.

It would be quite feasible to incorporate an RC circuit with a variable resistance or capacitance in each yarn cleaner. However, an individual adjustment would then have to be made for each cleaning problem in each cleaner. There would then be the difficulty that, apart from the inefficient expenditure of time for each individual adjustment, all of the cleaners in any given installation might not all have the same apparent sensing field length, due to a false adjustment. Additionally, the installation of such individual adjustment means in each cleaner would involve a considerable increase in costs.

It is with the above problems and desiderata in mind that the present means including both method and apparatus have been evolved. The novel means provide for remote adjustment of the sensing field of any desired number of quality control equipment installations in a given production system, such as a textile mill cleaning room.

It is accordingly among the primary objects of this invention to provide improved means for controlling the range of sensitivity of the sensing elements of quality control equipment.

A further object of the invention is to provide means for increasing the virtual sensing field length of the sensing elements of quality control equipment.

It is also an object of the invention to provide means for adjusting from a central point the sensitivity of the sensing elements of a plurality of quality control equipment installations such as yarn cleaners so that there is a uniformity of controlled production.

These and other objects of the invention which will become hereafter apparent are achieved by providing a control voltage from a central power supply to all of the quality control instruments such as yarn cleaners. The power supply unit supplies a control voltage adjustable to any value between given limits. Means, such as control leads are employed for supplying this control voltage to all the associated yarn cleaners, and an RC circuit associated with each yarn cleaner and influencing the frequency characteristics of the measuring elements in dependence upon the control voltage.

A feature of the invention resides in the utilization of a single central power supply unit for all of the controlled equipment, so that adjustment at this central unit permits sensitivity regulation of all of the associated quality control equipment.

Figure 2:
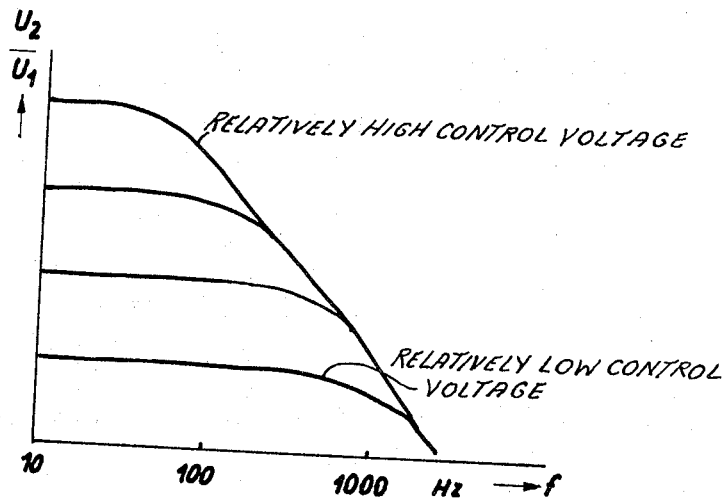
Figure 3:
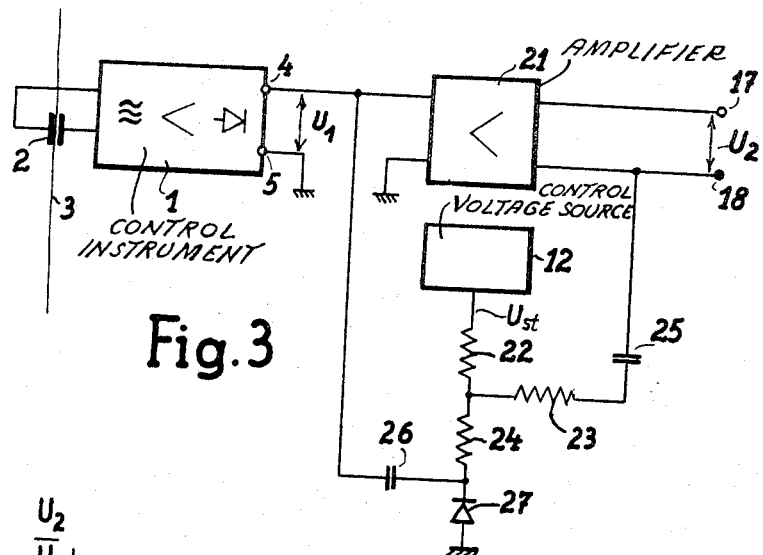
Figure 4:
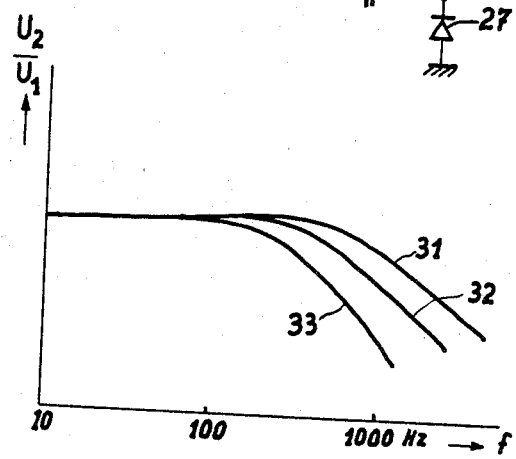
Figure 5:
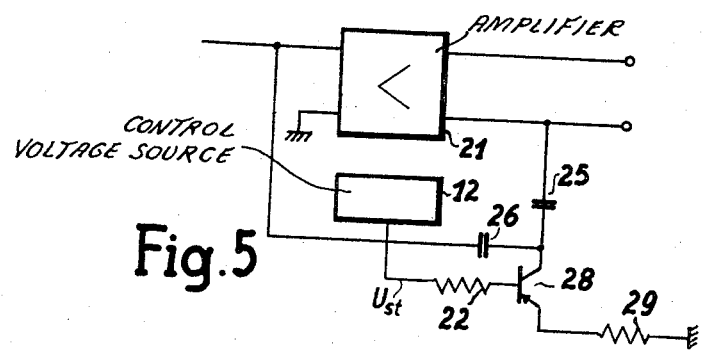

The details of a preferred embodiment of the invention and their mode of functioning will be particularly pointed out in conjunction with the accompanying drawings, wherein:

FIG. 1 schematically illustrates a circuit arrangement for altering an amplifier parameter of a transistor stage;

FIG. 2 diagrammatically illustrates the frequency curve obtainable with the circuit arrangement of FIG. 1;

FIG. 3 schematically illustrates a circuit arrangement for altering the negative feedback of an amplifier stage;

FIG. 4 diagrammatically illustrates the frequency curves resulting from the circuit arrangement of FIG. 3; and FIG. 5 is a detail of the circuit of FIG. 3, showing how a transistor may be employed in lieu of a diode to control resistance.

Referring now more particularly to the drawings, like numerals in the various figures will be employed to designate like parts. As seen in FIG. 1, a control instrument 1 is provided for controlling textile material such as slivers, rovings and yarns. The instrument comprises a sensing element 2, for example in the form of an electric condenser, the capacitance of which is influenced by the textile material 3 in known manner. The control instrument 1 also contains all the elements such as high frequency voltage source, amplifiers and detectors, that are necessary for converting the variations in capacitance occurring in the measuring or sensing element 2 to electrical signals at the output terminals 4, 5. These signals constitute an alternating voltage which is an electric replica of the variations in cross-section or diameter of the textile material 3, for example a yarn. Control instruments of this type are shown in Patents 3,039,051 and 3,009,101.

This alternating voltage signal is amplified in a transistor 6 which is provided with an emitter resistor 7 which serves to stabilize the current. The collector of transistor 6 is coupled to a variable resistor 8 the resistance value of which is electrically adjustable within a given range. The operating point of this amplifier circuit is determined by control current 9. This control current 9 which is determined by control voltage source 12 and control resistor 10 is supplied to the base of the transistor 6. The output of control voltage source 12 may be fed to a plurality of control instruments 1 via conductors 13.

Condenser 11 is arranged in parallel with the variable resistor 8. The variable resistor 8 and the condenser 11 together substantially form a low-pass filter. The time constant of this low pass filter is determined by the capacitance C of the condenser 11 and the value R of the variable resistor 8.

Condenser 14 and resistor 15 act as a high pass filter to separate the signals from the operating point of the transistor 6. A pure alternating voltage signal $U_2$ is thus produced at the output terminals 17, 18.

The alteration in the time constant of the low pass filter 8, 11 is now produced as follows: If only a very weak control current 9 flows through the control resistor 10, then only a weak current flows in the transistor 6. The conductivity of the variable resistor 8 is therefore low. If, for example, the variable resistor 8 is an NTC resistor (i.e. a resistor with negative temperature coefficient) then it has a high resistance at low current flow, and the time constant of the RC circuit is therefore relatively high. In the converse case, i.e. with a relatively strong control current 9, a relatively high working current flows through the transistor 6, whereby the resistance value of the NTC resistor is lowered.

By selecting the elements, it is thus possible to keep the influences of a variable ambient temperature on the described circuit very low, so that these influences no longer have any disturbing effect. In some cases, it is preferable to use a VDR resistor (i.e. a voltage dependent resistor) instead of the NTC resistor. The operation when such a resistor is used is the same as described with reference to the use of an NTC resistor except that the effect is produced directly by the current instead of indirectly by the temperature, namely that the resistance falls with increasing currents. When a VDR resistor is used, care should be taken to choose one having as large an internal time constant as possible, because otherwise unwanted modulation phenomena would occur since the alternating voltages themselves, and not only the mean control current, modulate the resistance.

The properties obtained with a circuit arrangement according to FIG. 1 can be represented very clearly with the aid of a frequency curve (FIG. 2). The frequency of alternating voltage is plotted on the abscissa and the amplitude relationship between the output voltage $U_2$ and the input voltage $U_1$, i.e. the amplification factor, is plotted on the ordinate. Some values of the variable resistor 8 are entered as parameters. It is clear from this diagram that at low frequencies, the amplification remains substantially constant. For some cases it is extremely desirable that by altering the time constants of the RC circuit elements 8 and 11, the amplification is increased for the lower frequencies but not for the higher frequencies. It should be noted here that low frequencies correspond to slow changes in the textile material, i.e. elongated alterations in cross-section whereas high frequencies correspond to short changes. It is possible in this way to emphasize certain events in the course of change in the equivalent electrical quantity corresponding to the variations in material cross-section or diameter, whilst other events producing high frequencies, which are of no interest, remain constant in their amplitude.

Another circuit arrangement which also enables the frequency curve of an amplifier stage to be influenced as a function of a resistance which is controllable by some electrical factor is shown in FIG. 3. The control instrument 1 with measuring or sensing element 2 and textile material 3 produces an alternating voltage $U_1$ at the output terminals 4, 5 as in the arrangement of FIG. 1. This alternating voltage $U_1$ reaches an amplifier stage 21 which in turn supplies an amplified output signal $U_2$. A control voltage $U_{st}$ which is applied to a voltage divider formed by resistors 22 and 24 and a controllable resistance element such as diode 27, is supplied to control voltage source 12 which is common to all the control instruments and may be connected thereto by means of conductors 13. The resistance of this diode 27 is dependent on the current provided by the control voltage $U_{st}$. At the same time, a part of the output voltage $U_2$ is applied to the junction between the resistors 22 and 24 through a condenser 25 and resistor 23. A part of this output voltage is tapped at the junction between the resistor 24 and the diode 27 and returns to the input of the amplifier stage 21 through a condenser 26.

The control voltage $U_{st}$ from the control voltage source 12 produces only a given resistance in diode 27 so that the part of the output alternating voltage $U_2$ which returns to the input $U_1$ is also determined by this resistance. If the control voltage $U_{st}$ is relatively small, then only a weak current flows through the voltage divider 22, 24, 27. Under these operating conditions, the diode 27 has a high differential resistance. If, on the other hand, the control voltage $U_{st}$ is relatively high, then a relatively strong current flows through the voltage divider 22, 24, 27, and the differential resistance of the diode 27 is much lower. The partial voltage occurring at the diode 27 is applied as feedback voltage to the input of the amplifier stage 21. The degree of feedback is thus adjustable by the control voltage $U_{st}$ and has a lower value at high control voltage than at low control voltage. The frequency curve of the FIG. 3 circuit arrangement is shown in FIG. 4 as illustrative of the attainable increase in the virtual measuring field length. In this diagram, the abscissa again gives the value of the frequency and the ordinate the degree of amplification of the amplifier stage 21. The parameter for the three frequency curves shown is the control voltage $U_{st}$ which may, for example, be one volt for the frequency curve 33, 5 volts for the frequency curve 32, and 25 volts for the frequency curve 31.

FIG. 5 shows a circuit arrangement slightly different from that of FIG. 3, in which the controllable resistance is formed by a transistor 28. In this arrangement, the control voltage determines the transistor base voltage and hence its collector current. The degree of feedback for the amplifier stage 21 is thus determined according to the magnitude of this base voltage. One advantage over the use of a diode as in FIG. 3 is the greater range of conductivity, i.e. the differential resistance of the transistor 28 covers a wider range of resistances than that of a diode 27.

In these circuit arrangements according to FIGS. 3 and 5, the amplification factors of the amplifier stage are constant in the region of low frequencies and only the limiting frequency is shifted by the magnitude of the control voltage. For certain purposes, these solutions provide considerable advantages compared with that shown in FIG. 1. One is that a controllable resistance independent of temperature is used.

The above disclosure has been given by way of illustration and elucidation, and not by way of limitation, and it is desired to protect all embodiments of the herein disclosed inventive concept within the scope of the appended claims.

What is claimed is:

1. Means for remotely controlling the virtual sensing field of the sensing elements of electronic quality control instruments of which said sensing elements form a part, said means comprising: an amplifier; power supply means connected to said amplifier providing a control voltage common to each of the quality control instruments employed; means for supplying the control voltage from the power supply means to the quality control instruments; and an RC circuit in the circuit from the power supply means to the control instrument to influence the frequency curve of the signal produced by a sensing element of the control instrument.

2. Means as in claim 1 having negative temperature coefficient resistor means electrically coupled to said control voltage supply means through which the control voltage is fed.

3. Means as in claim 1 in which resistance means are electrically coupled to said control voltage supply means, said resistance means having a resistance characteristic varying as a function of the voltage applied to it.

4. Apparatus for remotely controlling the virtual sensing field of sensing elements of electronic quality control instruments of which said sensing elements form a part said apparatus comprising: an amplifier; a control voltage source connected to said amplifier situated in a power supply unit which is common to a plurality of control instruments, the said control voltage source supplying a control voltage which is adjustable to any value between predetermined limits, means for supplying the control voltage to all the associated control instruments, and a common RC circuit from the control voltage source which is associated with each control instrument and which influences the frequency curve of a measuring element of the control instrument.

5. An apparatus according to claim 4 in which said RC circuit comprises a resistor with negative temperature coefficient and a condenser as low pass filter with controllable time constant.

6. An apparatus according to claim 4 in which said RC circuit comprises a resistor with a resistance characteristic which is dependent on the voltage, and a condenser with the time constant of the RC circuit adjustable by the control voltage.

References Cited

UNITED STATES PATENTS

| | | | |
|---|---|---|---|
| 2,654,288 | 10/1953 | Savadelis | 73—160 X |
| 2,679,639 | 5/1954 | Locher | 324—61 X |
| 3,106,762 | 10/1963 | Riera | 73—160 X |
| 3,188,564 | 6/1965 | Felix | 324—61 |

OTHER REFERENCES

Cook and Folmar, Detection Circuit, IBM Technical Disclosure Bulletin, vol. 7, No. 8, January 1965, pp. 654, 655.

JOHN F. COUCH, *Primary Examiner.*

A. D. PELLINEN, *Assistant Examiner.*